United States Patent [19]

Behling

[11] 4,115,529
[45] Sep. 19, 1978

[54] HALOGEN HYDRATE FORMATION FROM HALOGEN AND FINELY DIVIDED AQUEOUS DROPLETS

[75] Inventor: Harvey L. Behling, Madison Heights, Mich.

[73] Assignee: Energy Development Associates, Madison Heights, Mich.

[21] Appl. No.: 753,692

[22] Filed: Dec. 23, 1976

Related U.S. Application Data

[63] Continuation of Ser. No. 375,567, Jul. 2, 1973, abandoned.

[51] Int. Cl.² .............................................. C01B 7/02
[52] U.S. Cl. .................................... 423/472; 423/462; 423/500
[58] Field of Search ..................... 423/472, 462, 500

[56] References Cited

U.S. PATENT DOCUMENTS

| | | | |
|---|---|---|---|
| 3,793,077 | 2/1974 | Behling | 423/462 X |
| 3,908,001 | 9/1975 | Symons et al. | 423/472 |

*Primary Examiner*—Earl C. Thomas
*Attorney, Agent, or Firm*—Stanley H. Lieberstein

[57] ABSTRACT

Halogen hydrates, such as chlorine hydrate, are made by directing finely divided droplets of an aqueous medium onto a refrigerated surface which is at a temperature below that at which the hydrate forms, while also contacting said surface and said aqueous medium with the halogen to be converted to halogen hydrate. Apparatuses and methods are described. In a preferred embodiment of the invention the atomized droplets of aqueous medium, in very finely divided droplet form are directed onto a moving corrosion resistant metal surface from which the hydrate is subsequently removed. In another embodiment of the invention chlorine gas is utilized to atomize the aqueous medium and the mixture of chlorine and aqueous droplets is directed onto a forming surface.

6 Claims, 6 Drawing Figures

HALOGEN HYDRATE FORMATION FROM HALOGEN AND FINELY DIVIDED AQUEOUS DROPLETS

This is a continuation of application Ser. No. 375,567 filed July 2, 1973, now abandoned.

BACKGROUND OF THE INVENTION

In the production of non-polluting motor vehicles wherein electric drives replace the internal combustion engine high energy density batteries of the secondary type have been employed to drive a main electric motor or individual electric motors powering the wheels of the vehicles. Such high energy density (HED) batteries are those which are capable of generating at least 50 watt-hours per pound. Among these, one which shows great promise for commercial acceptance is based on metal and halogen electrodes in an aqueous electrolyte of the metal halide. Particularly useful is such a system wherein the negative terminal is connected to zinc or other suitable metal electrodes of a plurality of cells and the positive terminal is connected to "chlorine electrodes" which preferably are created by bringing gaseous chlorine, dissolved or dispersed in aqueous metal chloride electrolyte into contact with an inert conductive electrode, such as through openings in an inert electrode, such as one of porous carbon or graphite.

In metal-halogen HED batteries suitable for motor vehicles a convenient source of halogen is needed and, as described in U.S. Pat. No. 3,713,888 halogen hydrates are convenient sources of halogens and chlorine hydrate is especially suitable for use in furnishing chlorine to the electrolyte as feed for the chlorine electrodes of the present batteries. The halogen hydrates of chlorine and bromine are normally solids. It is believed that chlorine hydrate should be given the formula $Cl_2 \cdot 6H_2O$, which may be maintained in the solid state at temperature below 9° C. and atmospheric pressure, and preferably in the range of −50° to +5° C. The chlorine may be supplied to the HED batteries by addition of halogen hydrate to circulating electrolyte during the period in which the battery is discharging and such supply may be effected by physical addition of the hydrate or by thermal decompositions thereof and feeding of the products chlorine and water to the electrolyte. The hydrate may be manufactured in conjunction with the operation of the motor vehicle or may be produced in a larger installation from which it may be supplied to motorists in need of "refueling". In either case, improved apparatuses and processes for the manufacture of the hydrates have been needed.

In the past several such apparatuses and methods have been invented by researchers working for the present assignee. These are the subjects of U.S. patent application, Ser. No. 257,114, filed July 5, 1972, entitled, Apparatus and Method for Producing Halogen Hydrate; Ser. No. 200,047, filed Nov. 18, 1971 for Manufacture of Chlorine Hydrate; and Ser. No. 200,046, filed Nov. 18, 1971 for Apparatus and Method for Making Chlorine Hydrate from High Energy Density Battery Electrolyte and Chlorine. In the methods described in those applications the aqueous medium employed with the halogen was in a continuous liquid state, obtained from a pool of liquid, or was condensed from water vapor. Although the methods described therein are practicable, additional advantages and improved production rates are found to result from the use of the aqueous medium in the particular form described in this invention and by utilizing the other conditions and apparatuses thereof.

SUMMARY OF THE INVENTION

In accordance with the present invention an apparatus for the manufacture of a halogen hydrate comprises means for maintaining the surface at a temperature at which halogen hydrate will be formed, means for contacting said surface with halogen and means for forming finely divided aqueous droplets and bringing them into contact with the halogen and said surface. In preferred embodiments of the apparatus a moving forming surface is utilized, it is held at a particular temperature, the aqueous medium droplets are in a range of small diameters, the aqueous medium is cooled before atomization, coalesced droplets of aqueous medium are recycled back to the atomizer and means are provided for removal of the halogen hydrate from the forming surface. Also within the invention are methods for manufacturing the halogen hydrate and of special interest is one which utilizes gaseous halogen (chlorine) to aspirate aqueous medium into the atomizing means so as to maintain intimate contact of the chlorine with the finely divided droplets of the aqueous medium from the time of production until contact of both is made with the refrigerated forming surface.

DESCRIPTION OF THE PREFERRED EMBODIMENTS

The present invention and mode of operation will be apparent from the following description, taken in conjunction with the accompanying drawing in which.

Figure 1:
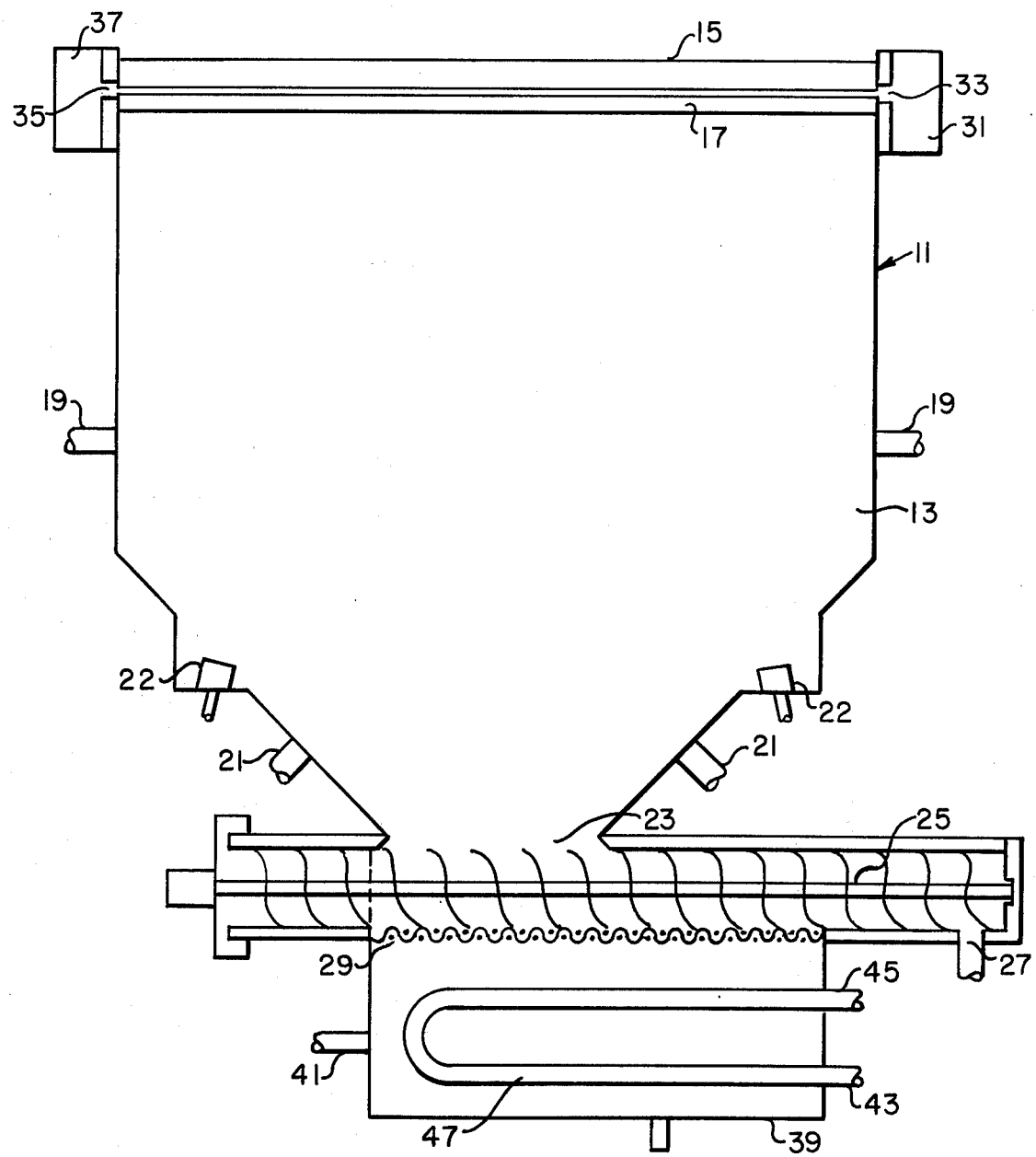
FIG. 1 is a vertical sectional elevational view of an apparatus of the present invention wherein chlorine hydrate is formed on refrigerated plates at an upper portion of an enclosure into which chlorine is fed and onto the refrigerated plates of which a fog or mist of aqueous medium is directed.
Figure 5:
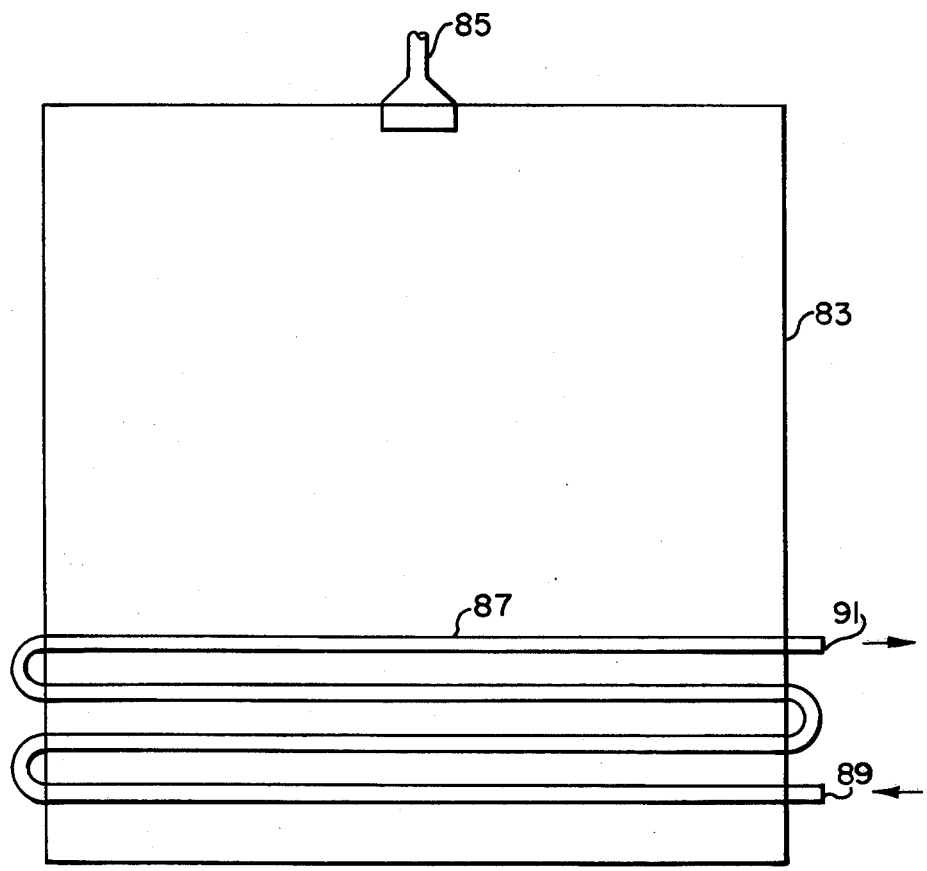
Figure 6:
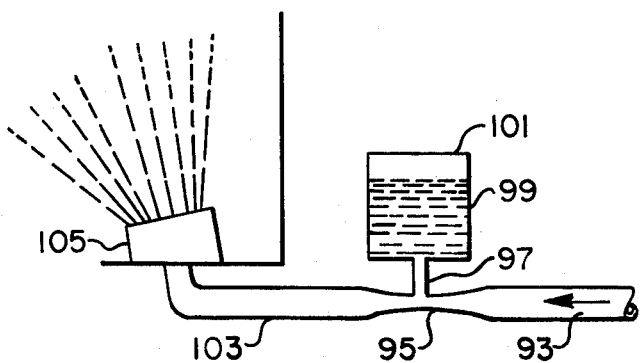

FIG. 5 is a central vertical sectional view of still another apparatus for hydrate production in which the hydrate formation is on cooling tubes; and FIG. 6 is a partial vertical sectional elevation of an apparatus corresponding to that of FIG. 1 with the chlorine and aqueous fog addition means are replaced by a combination of aspirator and fogging means by which finely divided droplets of aqueous medium are produced in the chlorine.

As shown in FIG. 1, hydrator 11 includes an enclosure 13 which is of square cross section, with a top 15, below which are suspended refrigerated cooling plates 17 on which chlorine hydrate is formed, at the side of which there are inlets 19 for chlorine gas and at the bottom of which are other chlorine inlets 21 and spray nozzles 22 for adding a fog of water or aqueous electrolyte to the hydrator, directed upwardly into contact with the cooling plates. At the bottom of the enclosure is an opening 23 through which chlorine hydrate may fall onto conveying means 25 from whence it is carried to a discharge opening 27 after passing over a screen 29 where any excess liquid is drained off. The discharge may be directly into a hydrate storage area or zone, such as that illustrated in previously mentioned U.S. Pat. No. 3,713,888, or may be sent to a storage zone from which a portion may be removed when any of a great number of metal-chlorine electrode HED battery systems is in need of additional chlorine fuel.

Cooling plates 17 extend vertically downward from the top of the enclosure but in some embodiments of the invention may be slanted somewhat (e.g., to 45° from the vertical) providing that the chlorine hydrate formed may be removed from them by suitable means, e.g., by breakers, shakers, scrapers, high pressure gas or liquid blasts, etc., not shown. Also, although flat plates are most desirable, other shapes of cooling surfaces for producing the hydrate may be substituted. As illustrated, the plates are cooled by the passage of a coolant through the interiors of the plates. It is shown as entering the plates from manifold 31 and passing through pipes 33, exiting through pipes 35 to a manifold 37. The cooling fluid may be any of the normal refrigerants, e.g., halogenated lower hydrocarbons such as the Freons ®, Genetrons ® and Ucons ®, particularly the flourinated hydrocarbons; ammonia; sulfur dioxide or cooled solutions of ethylene and/or propylene glycol and water. Standard refrigeration means, not illustrated, are employed to regulate the temperature of the coolant so that it is sufficiently below the temperature, above which chlorine hydrate will not exist, to produce the hydrate on the plates. Such temperature is below 9° C. and almost always below 5°, preferably being in the range of −5° C. to 1° or 5° C., more preferably from −20° to 5° C. The important consideration is that the surface of the plates and the surfaces of any thin layers of chlorine hydrate on the plates should be cold enough to form the hydrate from impinging chlorine gas and fog of aqueous medium. If the effective temperature at the point of hydrate formation is above 0° C. (e.g. above 1° C.) at atmospheric pressure, no ice will form, only chlorine hydrate.

The chlorine gas entering inlets 19 will usually be slightly above atmospheric pressure when the enclosure is at atmospheric pressure. However, since the pressures in the hydrating system can be superatmospheric or subatmospheric, too, the pressure of the gas entering the enclosure may be only slightly above that inside but sufficient to cause a flow of feed gas. The chlorine gas may be obtained from a pressurized source (tank or cylinder) thereof, not illustrated, or from "spent" electrolyte or by electrolysis of aqueous sodium chloride or other source of chloride ion. It is desirably cooled before entering the misting means and the cooling should be to a temperature below 10°, preferably below 5° C. However, because of the low heat capacity of the gas, compared to the water utilized and the cooling capacity of the cooling plates it is possible to utilize the chlorine directly, without previous cooling.

A fog or mist of water droplets is created by suitable atomizing means such as nozzle 22 but it is contemplated that other atomizers, foggers or mist producers may be substituted for these. The atomizers are powerful enough to produce aqueous particles or droplets of liquid having diameters in the range of 1 millimicron to 1 millimeter, preferably from 1 millimicron to 100 microns and most preferably from 10 millimicrons to 10 microns. The atomizers direct such fog through the incoming chlorine gas so that it reaches the cooling plates on the top of the hydrator enclosure. The aqueous medium fed to the atomizer may include recycled liquid removed from the chlorine hydrate by drainage through screen 29 and such liquid, stored in lower tank 39, may have additional aqueous medium added to it through line 41. Coolant inlet and outlet pipes 43 and 45, utilizing essentially the same type of coolant as described for cooling the plates, and internal loop 47 are provided to cool the aqueous medium to a temperature of below 10° and preferably below 5° C. In some instances no cooling will be used and all heat extracted for hydrate formation passes through the refrigerated plates. The aqueous medium employed is often an electrolyte suitable for use in the present HED battery but may be water.

In operation, refrigerant is pumped through the lines to cool tank 39 and plates 17, chlorine is added or blown into the enclosure through inlets 19 and 21, conveyor screw 25 is actuated and aqueous medium is pumped from tank 39 at the desired temperature through atomizing nozzles 22, directed at plates 17. The rates of additions of chlorine and water (in the aqueous medium) are held at such levels that the stoichiometric ratio of about 6 moles of water per mole of chlorine gas is present at the surface of the refrigerated plates on which the hydrate is formed. In some cases, a stoichiometric excess of chlorine may be desirable to assure that the hydrate will not be contaminated with ice. Nozzle operation will be controlled to give the most desirable particle size distribution of the fog for most efficient and purest hydrate production. The numbers of nozzles and chlorine inlets may be adjusted and may be distributed in various ways about the perimeter and bottom of the enclosure and such distribution and spraying directions may create distinctive swirlings or turbulent mixings of the enclosure contents. In any case, the chlorine will intimately mix with the very finely divided aqueous fog particles and, because of the small size of the particles and their liquid state, will dissolve in them, with said solution being especially good at the low temperature employed. Also, the chlorine will cause some of the liquid on the surface of the very finely divided particles to evaporate, absorbing heat and further lowering the temperature of the fog as it, with chlorine dissolved therein, impinges on the cooling surface and is converted to chlorine hydrate. Because of the small particle sizes of the liquid droplets contacting the refrigerated surface each has absorbed more chlorine than would be the case with larger particles or coatings of moisture applied to the cooling surface and after impingment on said surface the small deposits of moisture, if not in hydrate form, can contact additional chlorine and, at the lowered temperature, can better form the hydrate. Thus, a thicker layer of essentially pure chlorine hydrate can be produced on the cooling surface, with the limiting factor being the heat transfer to said layer. For best heat transfer and least corrosion it is desirable that the plates be made of a corrosion resistant conductive metal such as titanium or tantalum or alloys thereof, although other metals may be employed so long as periodic cleanings and replacements are effected.

After the hydrate has formed on the refrigerated plate and is shaken or scraped off, it falls through the enclosure, contacting the aqueous fog and additional chlorine gas if the process is continuous. In such contactings, any moisture that may be frozen onto the surface of the hydrate, due to contact of the hydrate with fog particles, will tend to be frozen thereon with chlorine to form the hydrate but if such moisture contacts particles before it had appreciable contact with chlorine it may form an ice coating on them. Thus, the advantage of addition of chlorine to the system at several locations near the outlet is evidenced since it aids in increasing the chlorine content and converting to the chlorine hydrate.

The chlorine hydrate produced is carried off by screw conveyor 25 and any fog droplets which may coalesce and fall to the bottom of the enclosure are enriched by contact with chlorine admitted there and, if they do not form hydrate with it, may act to wash the hydrate crystals and pass through the screen to reservoir 39.

Figure 3:
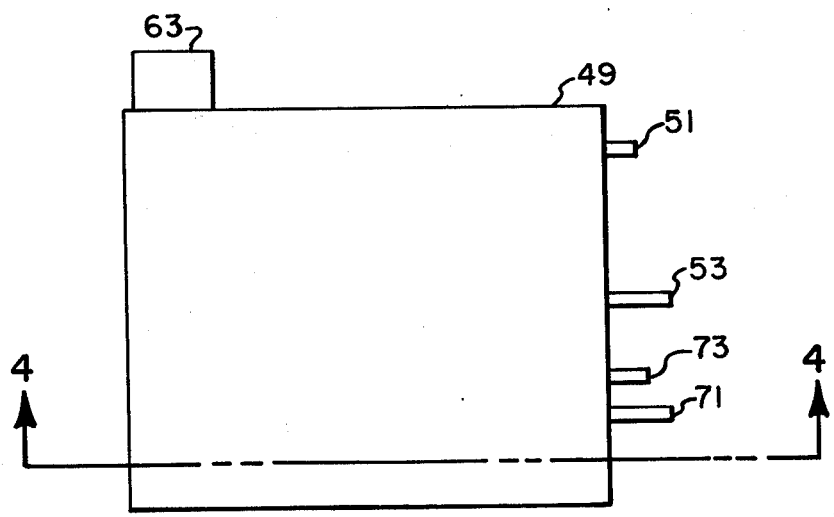
FIG. 3 is a top plan of another apparatus of this invention wherein chlorine hydrate is formed on a rotating drum from gaseous chlorine and aqueous fog directed onto said drum.
Figure 4:
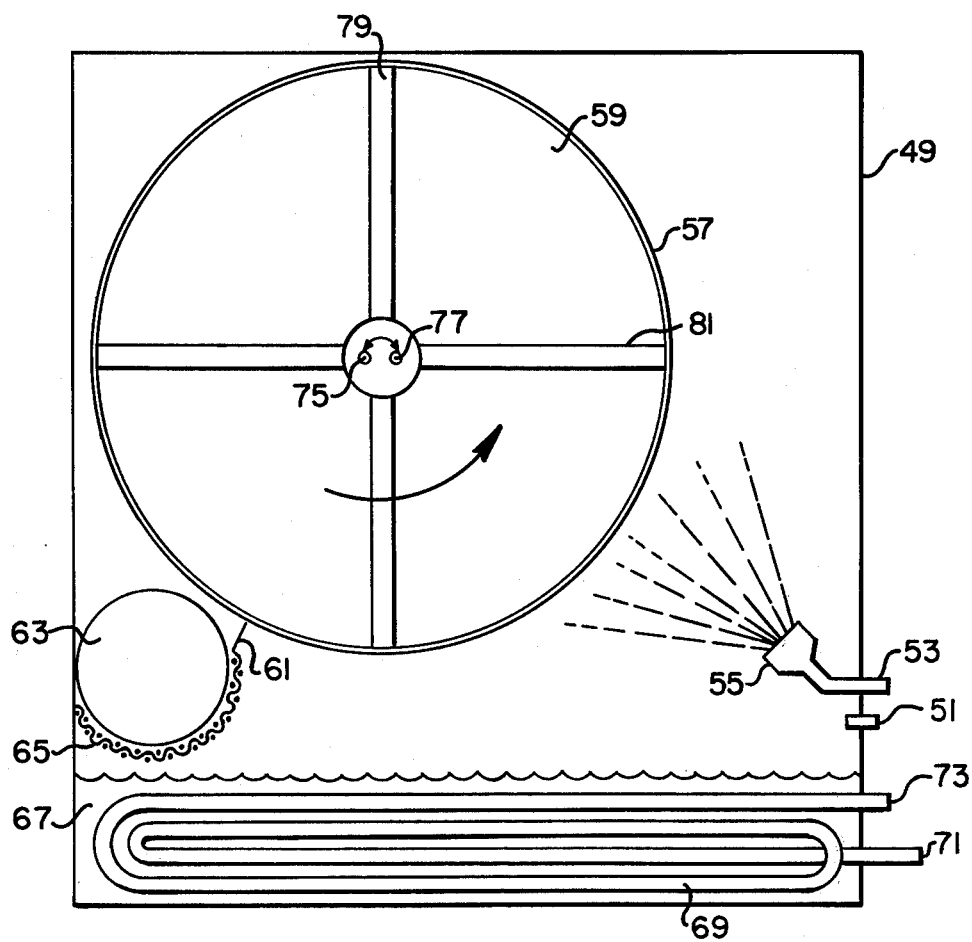
FIG. 4 is a vertical sectional view along plane 4—4 of FIG. 3.

In FIGS. 3 and 4 is illustrated an apparatus like that of FIG. 1 but with various elements thereof located somewhat differently and with the cooling or hydrate forming surface being a movable one. Thus, enclosure 49 is illustrated as cubical although it is to be understood that enclosures of other shapes, e.g., cylindrical, hemispherical, conical, frustoconical and parallelepipedal other than cubical may also be employed. Chlorine gas inlet 51 and aqueous medium inlet 53, connected to fogging and misting nozzle 55, are illustrated as single items but it is within the invention to utilize a plurality of these, several on each side and at various vertical locations to assure best mixing of the fog and the chlorine gas. As is indicated, the finely divided aqueous particles of the fog pass through the chlorine atmosphere and, together with dissolved and carried along or entrained chlorine, deposit on the rotating conductive corrosion resistant metal or alloy surface 57 of drum 59 and thereon are cooled to form the chlorine hydrate, which is removed by blade or scraper 61. The removed hydrate is carried out of the enclosure by screw or pusher conveyor 63 and any moisture thereon drips through screen 65 to reservoir 67 where it is cooled by cooling coil 69, the coolant entering inlet 71 and leaving through outlet 73. The surface 57 of drum 59 is cooled by a refrigerant passing through cooling coils 75 and 77 and through passageways 79, 81, etc. to the surface. From reservoir 67 the cooled aqueous medium is then fed to the fogging nozzle, and the process is repeated.

In FIG. 5 enclosure 83 contains a chlorine atmosphere into which aqueous medium is atomized through an atomizing head 85 and, falling through the chloride, dissolves and entrains some of it so that when it contacts cooling tube 87, which is held at a temperature below the hydrate formation point, chlorine hydrate forms thereon. Such hydrate may be removed by mechanical means or the enclosure may be disassembled periodically for scraping of the hydrate. Coolant enters the cooling coil at 89 and exits to refrigerating means, not shown, at 91. Conversely, if the enclosure 83 is the storage compartment of an electric energy storage device, the halogen hydrate need not be removed from the enclosure.

In FIG. 6 chlorine inlet line 93 admits chlorine under pressure to venturi 95 which is connected with line 97, through which flows aqueous medium 99 from tank 101. The low pressure created in the venturi throat draws liquid 99 with the gas and the gas passes with it through line 103, helping to blend the two together. The blending is further promoted by passage of the gasliquid mixuture (some of the gas already being dissolved in the liquid) through atomizing nozzle or fogger 105. Similarly, such combination mixer and atomizer for the chlorine gas and aqueous medium may be employed in other apparatuses of this invention. Additional feed electrolyte or water, sometimes containing condensate from the droplets, returns to container 101 and is subsequently passed through the atomizing means. The pressure utilized to get desired atomization may range from 20 to 500 lbs./sq. in. but is usually from 40 to 100 lbs./sq. in., compared to that usually employed for feeding chlorine gas to the various enclosures utilized in the invention, which pressure may be as low as one or two inches of water and rarely is higher than one atmosphere, normally being from two inches of water to twenty inches thereof.

The advantages of this invention over prior art methods of manufacturing halogen hydrates reside principally in the improved production rates and greater purities of the products made and these improvements are directly attributable to the very finely divided particle sizes of the mist or fog of liquid utilized. Production rates are often increased by 50% following the procedures of this invention, compared to prior art methods in which liquid baths or gases are employed to furnish the moisture to the cooling surfaces. Present techniques work equally well with pure water or with electrolyte, e.g., aqueous zinc chloride. They work when the entire gaseous content of the enclosure is chlorine (other than the moisture vaporized) but are also useful when as much as 50% but preferably no more than 25% of the content is air or other substantially inert gas.

The invention has been described with respect to the formation of chlorine hydrate but bromine hydrate may also be produced. For the production of bromine hydrate, it can be desirable to employ a vacuum in the hydrator so as to promote its presence as a gas surrounding the fog of aqueous medium. Also, the bromine may be well blended in with the liquid, as by passing both through an atomizer nozzle. Alternatively, bromine and chlorine may be mixed and a mixed halide electrolyte can be used. If chlorine hydrate is being made and aqueous zinc chloride electrolyte is being used the concentration thereof will normally be from 10 to 35%, preferably about 25%, the operating concentration which gives best conductivity, metal depositions rates, etc. and the like. Similar concentrations may be used for other halides.

Suitable metal halides are the chlorides or bromides, such as the Group II-(b) or Group VIII metal halides, with zinc chloride being preferred. Other metal halides that may be employed are the halides of the lanthamide and actinide series, as well as the halides of scandium, titanium, vanadium, chromium, manganese, copper, gallium, yttrium, zirconium, neobium, molybdenum, technitium, ruthenium, rhodium, palladium, silver, cadmium, indium, tin, hafnium, tantalum, tungsten, rhenium, osmium, iridium, platinum, gold, mercury, thallium, lead or bismuth.

Limiting factors in the production of chlorine hydrate are sometimes the heat transfer rates. By using metallic materials of construction, such as titanium or tantalum and alloys thereof, for the heat transfer means, and other corrosion resistant materials, including synthetic organic plastics, for other parts of the system, good heat transfer is obtained without the need for frequent maintenance. By employing gases and liquids, near the freezing point of water, but above it, less heat has to cool them to the hydrate forming temperature, and the only heat to be extracted will be that for such hydrate formation. Additionally, the cooling of the materials improves the dissolving of halogen in the liquid and thereby aids in forming the desired hydrate. In the particle size ranges described, without large droplets being present, the heat transfer from the particles is facilitated, even after they are deposited on the cooling surface.

The following examples illustrate, but do not limit the invention. Unless otherwise indicated, all parts are by weight and all temperatures are in ° C.

EXAMPLE I

Figure 2:
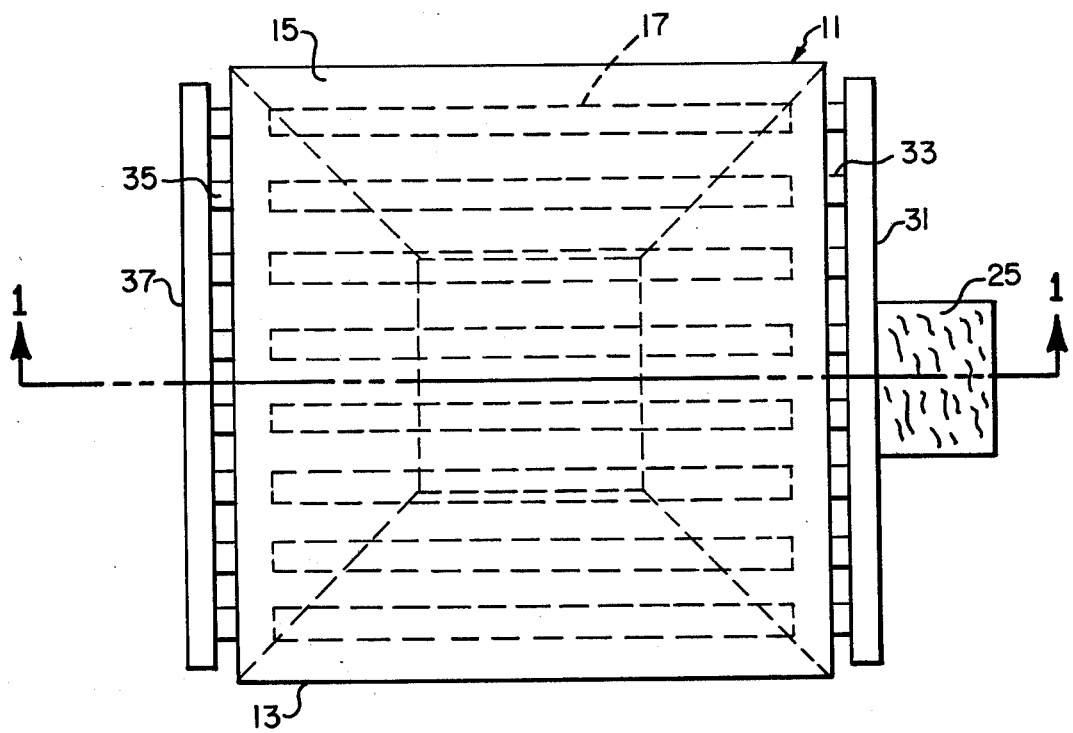
FIG. 2 is a top plan view of the apparatus of FIG. 1.

Using the apparatus illustrated schematically in FIGS. 1 and 2, chlorine gas is caused to flow into the inlet 19, at a pressure of approximately 0.5 psi above atmospheric, and is passed through the hydrator, 11, and out of the hydrate drain, 27, until all air, hydrogen, carbon dioxide or gases other than chlorine have been purged from the gas space in the hydrator. A solution consisting of 50% ethylene glycol and 50% water cooled by external refrigeration means, not shown, is caused to flow by external pumping means, not shown, into a coolant header 31 through tubes parallel in the flowpath, entry to which is represented by 33, outlet from which is represented by 35, into an outlet manifold 37, said tubes comprising the heat transfer surface for the hydrator. The temperature of the coolant leaving the outlet header 37 is monitored by a temperature sensor, not shown, and the coolant temperature is controlled such that the outlet temperature is never greater than 1° C. Coolant flow velocity should not be less than approximately 10 ft./second.

Aqueous zinc chloride solution, of concentration from 16% to 25% depending upon the state of charge of the battery is pumped into nozzles 22 by an external pump, not shown, at rates of approximately 300 cc/min. The solution passes through the orifice of the nozzle which in this example is approximately 0.2 inches in diameter, at a pressure of approximately 60 psi, forming a fine spray or mist of droplets which are normally of a size range of 20 microns to 10 microns which are caused by the momentum of the stream to impinge on the heat transfer surface, or to splash off the top cover, 17, of the hydrator such that 20% to 50% of the solution contacts the cooling surface. The material of the nozzle is titanium. Hydrate is formed on the cooling surface and washed off by the dripping action of the excess electrolyte, falling to the bottom of the chamber under gravity where it passes through opening 23 and is removed by action of the screw 25. Excess liquid drips through screen 29 into bottom reservoir 41, from which it is pumped for recycle. This reservoir is fitted with cooling tubes 43 which serve to cool the electrolyte to temperatures −7° to −5° C. The temperature of the coolant used for this cooling is normally 5° C. below the temperature of the electrolyte and the coolant is normally 50% ethylene glycol and 50% water.

A device having 5 tubes, item 17, ¼ inch in diameter may be operated in this manner absorbing 200 cc/min. of chlorine. Chlorine hydrate produced in this manner is transported with excess electrolyte as a slurry by the rotary motrion of the screw to the hydrate drain 27, where it is removed by a positive displacement pump (not shown) to a storage external to the system. The slurry transported may be from 3% to 20% chlorine hydrate, by weight, and normally is approximately 9% chlorine hydrate.

EXAMPLE II

The hydrator described in FIG. 6 operates on a slightly different principle than the other example in that the prime means for formation of chlorine hydrate, which may be a molecular composition containing varying amounts of $H_2O$ from $Cl_2 \cdot 6H_2O$ to $Cl_2 \cdot 8H_2O$, is from $H_2O$ vapor.

The liquid electrolyte sprayed from the atomizer 85 forming a finely divided mist or fog of droplets of 1.0 microns to 20.0 microns droplet size 1; which settle through the chamber 83 under gravity past the cooling tubes 87 into the bottom of the chamber. The presence of the many fine droplets in the vicinity of the cold tubes serves to increase the vapor pressures of the water in the vicinity of the tubes; allowing the moisture to evaporate from the individual droplets and diffuse to the cold tube 87 cooled, where it first condenses with the chlorine to form chlorine hydrate.

Apparatus of the type shown in FIG. 5 may be operated under the following conditions.

| Run | I | II |
|---|---|---|
| $Cl_2$ absorption rate | .365 gms/in.$^2$ | .318 gms/in.$^2$ |
| Liquid operating rate | 40 mL/min. | 20 mL/min. |
| Liquid spray pressure | 15 to 25 psi | 20 to 40 psi |
| Liquid temperature | 10° C. | 10° C. |
| Box pressure | ambient | ambient |
| Coolant surface area | 355 cm$^2$ | 355 cm$^2$ |
| Coolant temperature | −11.5° C. | −17.0° C. |
| Weight percent $Cl_2$ in hydrate | 31.3% | 29.9% |

Hydrate may be formed in this manner continuously until the spaces between the cooled tubes are filled with hydrate. The hydrate may then be removed by scraping the tubes with devices, not shown, or it may be allowed to remain in place on the tubes until such time it is desired to cause the hydrate to decompose so that the chlorine that it contains may be released for consumption in a battery during discharge.

What is claimed is:

1. A method of manufacturing a halogen hydrate which comprises the steps of:

maintaining a forming surface at a temperature sufficient to form halogen hydrate from a halogen and an aqueous medium, said surface being maintained at a temperature from about −20° to about −5° C;

introducing under pressure onto said forming surface: a halogen and an aqueous medium consisting of a plurality of atomized liquid droplets each having a diameter between 1 millimicron and about 10 microns, the temperature of said aqueous medium being maintained above the freezing point of said medium and below 5° C.

the pressure of said aqueous medium being greater than the pressure of said halogen, and said halogen and said aqueous medium being introduced in amounts such that the stoichoimetric ratio of halogen to water in the aqueous medium is at least about 6 moles of water per mole of halogen;

contacting said halogen and said aqueous medium on said forming surface such that the droplets of said medium are surrounded by said halogen to form halogen hydrate with a small percentage of some halogen becoming dissolved; and removing said halogen hydrate from said forming surface.

2. The method according to claim 1 wherein said halogen is chlorine and the halogen hydrate produced is chlorine hydrate.

3. The method of claim 2 wherein said aqueous medium is aqueous zinc chloride having a concentration from about 10% to about 35% by weight.

4. The method of claim 1 wherein the temperature of said surface is maintained by passing a coolant through the interior of said surface, said coolant being selected from the group consisting of halogenated lower hydrocarbons, ammonia, sulfur dioxide and a cool solution of ethylene and propylene glycol.

5. The method of claim 1 wherein said halogen is maintained at a temperature below about 10° C and is introduced onto said forming surface at a pressure of at least about 0.5 psi.

6. The method of claim 5 wherein said aqueous medium is introduced onto said forming surface at a pressure of at least about 60 psi.

* * * * *